Patented Aug. 26, 1941

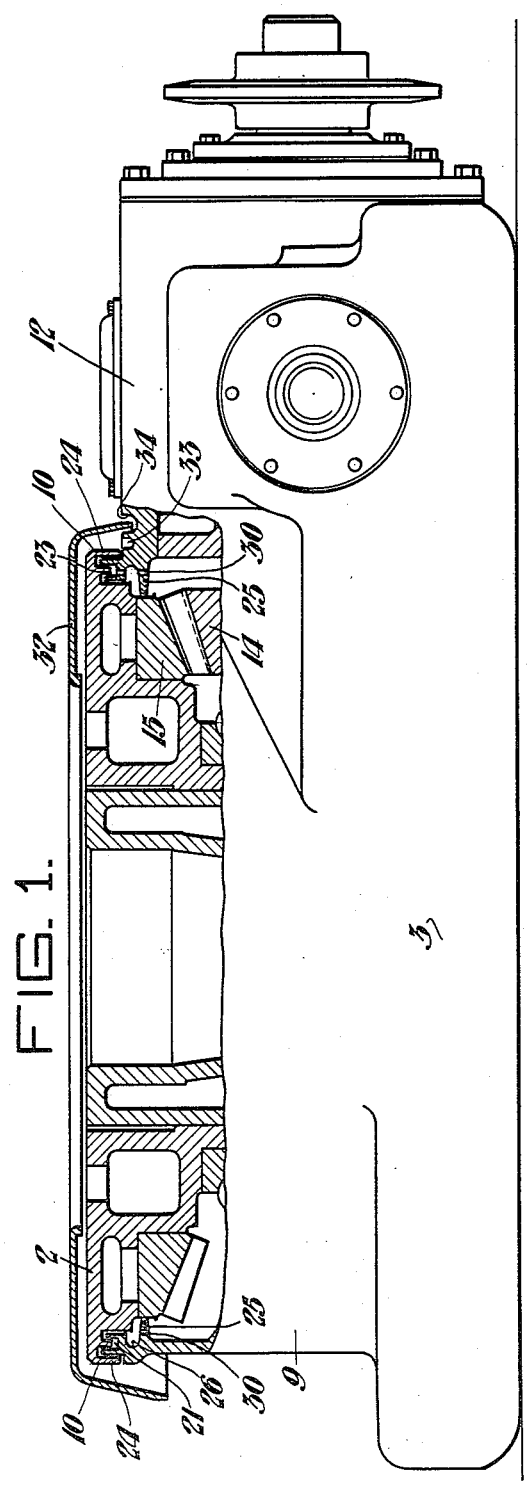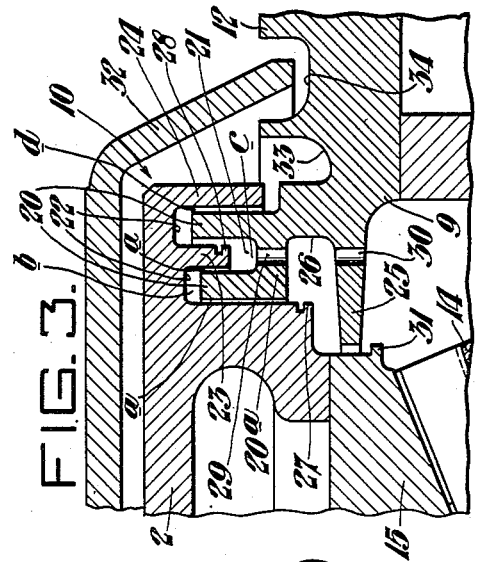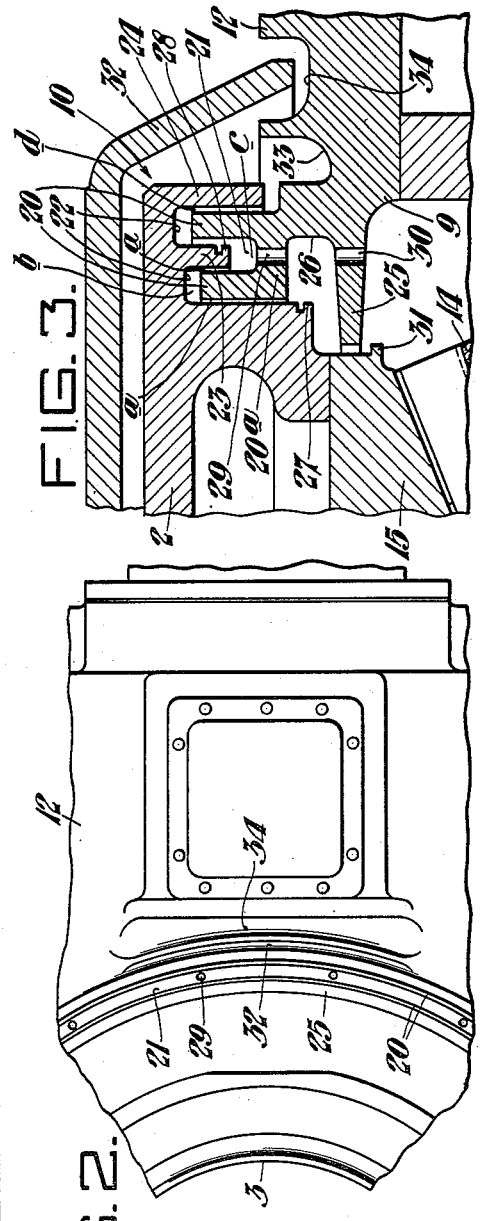

2,254,183

UNITED STATES PATENT OFFICE 2,254,183

TABLE SEAL FOR WELL DRILLING ROTARIES

August R. Maier and John M. Shimer, Dallas, Tex., assignors to Oil Well Supply Company, a corporation of New Jersey Application September 12, 1940, Serial No. 356,532

9 Claims. (Cl. 255—41)

This invention relates to well drilling rotaries, and more particularly to table sealing means therefor.

In rotary drilling, it is necessary to seal the joint between the periphery of the rotating table and the housing or substructure against the escape of lubrication from within and against the ingress of mud and foreign matter from without, and it becomes increasingly difficult to effect such a seal with high rotary speeds and with pressure lubrication of the rotary.

It is a prime object of our invention to provide an improved table seal for a well drilling rotary which will effectively seal the joint between the table and rotary housing under forced lubrication pressures and at high rotary speeds. Our invention contemplates a labyrinth seal which may be readily incorporated in the structure of the rotary table and housing, and which possesses simplicity and efficiency.

Additional objects and advantages will become apparent from the following description taken in connection with the accompanying drawing, wherein:

Fig. 1 is a side elevational view of a high speed well drilling rotary partially broken away to show the embodiment of our invention therein;

Fig. 2 is a fragmentary plan view thereof, with the table broken away to show the portion of the seal on the rotary housing; and Fig. 3 is an enlarged detail section of the table seal thereof.

Referring to the drawing, Fig. 1 illustrates a well drilling rotary including a table 2 rotatably mounted upon a base 3, the latter having an upright housing 9 enclosing the table mounting, bearings, etc. 12 designates the pinion shaft housing extending laterally at one side of the housing 9 and containing the shaft for driving the table gear 15 by a meshing pinion 14.

The rotary is lubricated internally and when the same is to be operated at high speeds, the lubrication preferably includes a forced or pressure system. The construction and lubrication of such high speed rotary is fully set forth in our companion application of even date, Serial Number 356,533.

The present invention is specifically directed to sealing means for the table 2, said means being generally designated 10 and providing against the escape of lubricant at the joint between the periphery of the table and the housing 9. Said means includes a labyrinth formed by spaced upright concentric annular walls 20 on the rotary housing 9 providing an upwardly open annular groove 21 therebetween, and a pair of concentric annular grooves 22 on the underside of the table 2 providing an intervening annular depending member 23 and an outer peripheral depending annular flange 24.

Upon assembling the table 2 upon the housing 9, depending member 23 of the table is entered in the groove 21 and upright members 20 of the housing are received in grooves 22 of the table, thereby forming an interfitting labyrinth adjacent the periphery of the table above and slightly outwardly beyond the table gear 15, said labyrinth also including the outer flange or member 24 of the table.

25 designates a horizontal inwardly extending annular baffle immediately above the teeth of the table gear 15, said baffle being formed on the housing 9 and being spaced below the bottom horizontal wall 20$^a$ of the labyrinth hereinbefore described, providing an intervening inwardly open annular groove or recess 26. The baffle 25 is spaced from the gear 15 for clearance.

Immediately below the wall 20$^a$ and within the recess 26, the table 2 is provided with an annular lubricant-throwing lip 27, and a second similar throwing lip 28 is provided on the outer lower edge of the table member 23 of the labyrinth, the latter lip being disposed in the housing groove or recess 21. Lubricant return ports 29 are provided in the housing 9 between and permitting a return flow of lubricant from the groove 21 to recess 26, and similar ports 30 are formed in and through the baffle 25 for return gravity flow of lubricant to the base 3 of the rotary.

Another lubricant-slinging lip 31 is provided on the outer periphery of the gear 15 above the teeth thereof and immediately below the baffle 25.

In operation, lubricant carried by the teeth of gear 15, tending to flow upwardly and outwardly, will be thrown laterally by the lip 31 outwardly against the housing 9 and thence will flow downwardly into the rotary base 3. For the most part, such lubricant will be prevented from upward travel by the baffle 25, but lubricant bypassing the baffle 25 will be thrown laterally by the second lip 27, into the groove 26, from whence it may flow by gravity to the rotary base through ports 30, the wall 20$a$ above the lip 27 acting as a baffle to prevent upward travel of the lubricant.

Lubricant passing the lips 31 and 27 may be thrown by lip 28 into recess 21, wherefrom the same may drain to the rotary base 3 through ports 29 and 30.

We have found that there is a tendency for the lubricant to set up a pressure zone under the centrifugal action of the table adjacent the table edge surfaces, wherefore we prefer to locate return or drain ports 29 and 30 outwardly beyond said zone so as to minimize any interference by said pressure with the return flow of lubricant through said ports.

Also, we have so constructed our improved labyrinth as to effectively retard the velocity of lubricant seeking to pass the sealing device. To this end, the clearance $a$ between the table 2 and the innermost upright member 20 and between said member and the depending member 23 is maintained as small as practicable, which restrictions, together with the intervening enlarged expansion volume $b$ in the base portion of the innermost table groove 22, effectively retard the outward flow of lubricant.

A further expansion space $c$ is provided between the member 23 and the groove 21, whereby the lubricant is readily thrown from the lip 28 and drained through ports 29 as stated. Thus, the entire construction effectively prevents the establishment of lubricant pressures and thereby adequately prevents the escape of lubricant to the exterior of the rotary.

Our improved table seal likewise prevents the ingress of mud and other foreign matter which would contaminate the lubricant and injure the wearing parts of the rotary. As is customary, a guard 32 is mounted over and encloses the periphery of the table 2, said guard functioning to convey mud and the like away from the table.

In addition, we prefer to provide the clearance $d$ between the outer rim flange 24 of the table and the outermost upstanding housing member 20 as small as practicable to prevent the entrance of such mud to the seal. Further, our invention includes the provision of a relatively deep groove 33 between the lower terminal edge of the guard 32 and the labyrinth sealing means, said groove being formed in the top of the housing 12 and serving to flow off any mud or the like which may enter between said guard and seal, thus preventing the formation of a fluid pressure between the table and guard. 34 designates a similar groove for receiving the guard edge outwardly beyond the groove 33, likewise serving to flow the mud or the like from the top of the housing.

Various changes and modifications are contemplated within the scope of the following claims.

We claim:

1. In a well drilling rotary including a rotatable table and a stationary housing, gearing for driving the table, a seal for the table above said gearing and including a peripheral lubricant-slinging lip on the table, said housing having an annular horizontal baffle disposed above the lip for confining the upward flow of lubricant therefrom.

2. In a well drilling rotary including a rotatable table and a stationary housing, gearing for driving the table, a seal for the table above said gearing and including a pair of spaced peripheral lubricant-slinging lips on the table, said housing having an annular baffle wall disposed above each of said lips for confining the upward flow of lubricant from the respective lips.

3. In a well drilling rotary including a rotatable table and a stationary housing, gearing for driving the table, a seal for the table above said gearing and including a pair of spaced peripheral lubricant-slinging lips on the table, said housing having an annular baffle wall disposed above each of said lips for confining the upward flow of lubricant from the respective lips, the lowermost baffle wall having openings therein for gravity drainage of lubricant from the uppermost throwing lip.

4. In a well drilling rotary including a rotatable table and a housing, gearing for driving the table, said table and housing having interfitting vertically disposed annular members comprising a labyrinth adjacent the periphery of the table above said gearing, a peripheral lubricant-slinging lip on the table below said labyrinth, and a horizontal baffle on the housing above the lip for confining the upward flow of lubricant therefrom.

5. In a well drilling rotary including a rotatable table and a housing, gearing for driving the table, said table and housing having interfitting vertically disposed annular members comprising a labyrinth adjacent the periphery of the table above said gearing, a pair of spaced peripheral lubricant-slinging lips on the table below said labyrinth, and said housing having a stationary annular baffle wall disposed above each of said lips for confining the upward flow of lubricant from the respective lips.

6. In a well drilling rotary including a rotatable table and a stationary housing, gearing for driving the table, said table and housing having interfitting vertically disposed annular members comprising a labyrinth adjacent the periphery of the table above said gearing, one of the labyrinth members on the table having an annular lubricant-slinging lip thereon and said housing having a recess containing said member and lip, said recess having sufficient volume to permit expansion of lubricant discharged from the lip, said housing also having a drainage opening permitting a gravity flow of lubricant from said recess.

7. In a well drilling rotary including a rotatable table and a stationary housing, gearing for driving the table, a seal for the table above said gearing and including a peripheral lubricant-slinging lip on the table, said housing having an annular horizontal baffle disposed above the lip for confining the upward flow of lubricant therefrom, said table and housing having interfitting vertically disposed annular members comprising a labyrinth adjacent the periphery of the table above said gearing, one of the labyrinth members on the table having an annular lubricant-slinging lip thereon and said housing having a recess containing said member and lip, said recess having sufficient volume to permit expansion of lubricant discharged from the lip, said housing also having a drainage opening permitting a gravity flow of lubricant from said recess, and said baffle having an opening therethrough having communication with said first opening for gravity drainage of said lubricant to the lower region of the housing.

8. In a well drilling rotary including a rotatable table and a stationary housing, gearing for driving the table, a seal for the table above said gearing and including a pair of spaced peripheral lubricant-slinging lips on the table, said housing having an annular baffle wall disposed above each of said lips for confining the upward flow of lubricant from the respective lips, said table and housing having interfitting vertically disposed annular members comprising a labyrinth adjacent the periphery of the table and above said slinging lips, one of the labyrinth members on the table having an annular lubricant-slinging lip thereon and said housing having a recess containing said member and lip, said recess having sufficient volume to permit expansion of lubricant discharged from the lip therein, said housing also having a drainage opening permitting a gravity flow of lubricant from said recess.

9. In a well drilling rotary including a rotatable table and a stationary housing, gearing for driving the table, an annular lubricant-slinging lip on the table above the gearing, a horizontal baffle on the housing immediately above the lip, said housing having an annular recess above said baffle and a second baffle wall thereabove, the table having a second annular lubricant-slinging lip in said recess immediately below said second baffle wall, a labyrinth on the table and housing above said second baffle wall including a pair of spaced upright concentric annular members on the housing providing an upwardly open annular groove therebetween, said table having a pair of concentric annular grooves on the underside thereof receiving the upright housing members and having an intervening annular depending member disposed in the upwardly open housing groove, said depending table member having an annular lubricant-slinging lip thereon, the second baffle wall having drainage openings communicating with the upwardly opening groove and the annular recess in the housing, and the lowermost baffle having openings therethrough for drainage of lubricant from the annular recess to the lower region of the housing.

AUGUST R. MAIER.
JOHN M. SHIMER.